(12) United States Patent
Song et al.

(10) Patent No.: US 7,081,989 B2
(45) Date of Patent: Jul. 25, 2006

(54) WIDE-BAND FIBER AMPLIFIER

(75) Inventors: Kwan-Woong Song, Songnam-shi (KR); Jun-Ho Koh, Suwon-shi (KR); Seong-Taek Hwang, Pyongtaek-shi (KR); Yun-Je Oh, Yongin-shi (KR)

(73) Assignee: Samsung Electronics Co., Ltd., Suwon-Si ( * ) Notice: Subject to any disclaimer, the term of this patent is extended or adjusted under 35 U.S.C. 154(b) by 281 days.

(21) Appl. No.: 10/688,560

(22) Filed: Oct. 17, 2003

(65) Prior Publication Data

US 2004/0233517 A1 Nov. 25, 2004

(30) Foreign Application Priority Data

May 20, 2003 (KR) .................. 10-2003-0032057

(51) Int. Cl.
*H04B 10/12* (2006.01)
*H01S 4/00* (2006.01)

(52) U.S. Cl. .................. 359/341.32; 359/341.33

(58) Field of Classification Search ........ 359/341.32, 359/341.33
See application file for complete search history.

(56) References Cited

U.S. PATENT DOCUMENTS

| | | | |
|---|---|---|---|
| 6,317,254 B1* | 11/2001 | Park et al. ............... | 359/337.13 |
| 6,437,907 B1* | 8/2002 | Yoon et al. ............. | 359/341.32 |
| 6,507,430 B1* | 1/2003 | Yenjay .................. | 359/341.31 |
| 6,621,627 B1* | 9/2003 | Willner et al. ........... | 359/349 |
| 6,646,796 B1* | 11/2003 | Song et al. .............. | 359/349 |
| 6,674,570 B1* | 1/2004 | Song et al. .............. | 359/349 |
| 6,731,426 B1* | 5/2004 | Yeniay et al. ........... | 359/341.32 |
| 2002/0167722 A1* | 11/2002 | Willner et al. ........... | 359/349 |
| 2002/0181091 A1* | 12/2002 | Song et al. .............. | 359/349 |
| 2003/0161033 A1* | 8/2003 | Hwang et al. ........... | 359/341.3 |
| 2003/0206334 A1* | 11/2003 | Hwang et al. ........... | 359/341.5 |
| 2004/0212873 A1* | 10/2004 | Hwang et al. ........... | 359/333 |
| 2004/0233516 A1* | 11/2004 | Hwang et al. ........... | 359/349 |
| 2004/0233518 A1* | 11/2004 | Song et al. .............. | 359/349 |
| 2004/0246569 A1* | 12/2004 | Feillens et al. .......... | 359/341.1 |

\* cited by examiner

*Primary Examiner*—Jack Keith
*Assistant Examiner*—Eric Bolda
(74) *Attorney, Agent, or Firm*—Cha & Reiter, L.L.C.

(57) ABSTRACT

Disclosed is a wide-band fiber amplifier for amplifying C-band and L-band optical signals, including a first amplifying unit including a first amplifying fiber adapted to be (1) pumped in at least one direction (2) amplify both the C-band and L-band optical signals and (3) output Amplified Spontaneous Emission (ASE), a second amplifying unit including a second amplifying fiber adapted to be pumped by amplified ASE and secondarily amplify the amplified L-band optical signal, and an L-band pumping light source including a third amplifying fiber adapted to be pumped in at least one direction while being pumped by the ASE, and output amplified ASE used to pump the second amplifying fiber.

12 Claims, 3 Drawing Sheets

WIDE-BAND FIBER AMPLIFIER

CLAIM OF PRIORITY

This application claims priority to an application entitled "WIDE-BAND FIBER AMPLIFIER," filed in the Korean Intellectual Property Office on May 20, 2003 and assigned Serial No. 2003-32057, the contents of which are hereby incorporated by reference.

BACKGROUND OF THE INVENTION

1. Field of the Invention

The present invention relates to an optical transmission system, and more particularly to a fiber amplifier for amplifying C-band and L-band optical signals propagating in the optical transmission system.

2. Description of the Related Art

To cope with the recent increase in the quantity of data transmission, a demand for a wavelength division multiplexing (WDM) optical transmission systems using an extended transmission bandwidth has developed. Accordingly, research is being actively conducted into a wide-band system using both a wavelength range of 1,530 to 1,560 nm the so-called C-band, and a wavelength range of 1,570 to 1,600 nm the so-called L-band. A n optical fiber amplifier doped with a rare-earth element, for example, erbium, is widely used to amplify optical signals in an optical transmission system. However, such erbium-doped fiber amplifiers (EDFA) have an available bandwidth limited to about 30 nm for each of C and L-bands. Although, Raman fiber amplifiers have a wide available bandwidth enabling amplification of both the C-band and the L-band, they require a high pumping power to obtain the desired gain. For this reason, EDFAs are widely used for wide-band fiber amplifiers. However, most EDFAs have a parallel arrangement for individually amplifying C-band and L-band optical signals.

FIG. 1 is a diagram illustrating of a conventional wide-band fiber amplifier. As shown in FIG. 1, the conventional wide-band fiber amplifier designated by the reference numeral 100 is connected to an external optical fiber 110. Wide-band fiber amplifier 100 includes first and second amplifying units 160 and 170, and first and second wavelength selective couplers 121 and 122 (WSC1 and WSC2), adapted to couple first and second amplifying units 160 and 170 in parallel.

First wavelength selective coupler 121 splits an optical signal with wavelengths of 1,550 and 1,590 nm into components having wavelengths of 1,550 nm (C-band) and 1,590 nm (L-band), respectively. T hereafter, it outputs the C-band optical signal to first amplifying unit 160 and the L-band optical signal to second amplifying unit 170.

First amplifying unit 160 includes first and second optical isolators 131 and 132 (ISO1 and IS02), first and second pump laser diodes 141 and 142 (PUMP LD1 and PUMP LD2), third and fourth wavelength selective couplers 123 and 124 (WSC3 and WSC4), and a first erbium-doped fiber 151 (EDF1). Each of first and second optical isolators 131 and 132 serves to cut off light from first erbium-doped fiber 151 advancing backwards, such as amplified spontaneous emission (ASE) noise or reflected light. First pump laser diode 132 outputs a first pumping light with a wavelength of 980 nm. Third wavelength selective coupler 123 outputs the first pumping light and C-band optical signal, inputted thereto, to first erbium-doped fiber 151. Second pump laser diode 142 outputs a second pumping light with a wavelength of 1,480 nm. Fourth wavelength selective coupler 124 outputs the second pumping light, inputted thereto, to first erbium-doped fiber 151, while passing the amplified C-band optical signal inputted thereto. First erbium-doped optical fiber 151 is bidirectionally pumped by the first and second pumping light, thereby amplifying the C-band optical signal inputted thereto.

Second amplifying unit 170 includes third and fourth optical isolators 133 and 134 (IS03 and IS04), third and fourth pump laser diodes 143 and 144 (PUMP LD3 and PUMP LD4), fifth and sixth wavelength selective couplers 125 and 126 (WSC5 and WSC6), and a second erbium-doped fiber 152 (EDF2). Each of third and fourth optical isolators 133 and 134 serves to cut off light from second erbium-doped fiber 152 advancing backwards, such as ASE noise or reflected light. Third pump laser diode 143 outputs a third pumping light with a wavelength of 980 nm. Fifth wavelength selective coupler 125 outputs the third pumping light and L-band optical signal, inputted thereto, to second erbium-doped fiber 152. Fourth pump laser diode 144 outputs a fourth pumping light with a wavelength of 1,480 nm. Sixth wavelength selective coupler 126 outputs the fourth pumping light, inputted thereto, to second erbium-doped fiber 152, while passing the amplified L-band optical signal inputted thereto. Second erbium-doped optical fiber 152 is bidirectionally pumped by the first and second pumping light, thereby amplifying the L-band optical signal inputted thereto.

Second wavelength selective coupler 122 couples the C-band and L-band optical signals respectively inputted thereto from first and second amplifying units 160 and 170, and outputs the resultant optical signal via external optical fiber 110.

However, conventional wide-band fiber amplifiers having the above mentioned configuration requires an increased length of the second erbium-doped fiber and high pumping power because the second amplifying unit has a low amplification efficiency. Furthermore, such a configuration suffers other limitations such as the wide-band fiber amplifier exhibiting a high noise figure in the L-band.

SUMMARY OF THE INVENTION

Therefore, the present invention has been made to reduce or overcome the above mentioned problems involved with the related art. One object of the invention is to provide a wide-band fiber amplifier having a high amplification efficiency while exhibiting a low noise figure, as compared to conventional amplifiers.

In accordance with the principles of the present invention, a wide-band fiber amplifier is provided for amplifying a first and second wavelength band, for example C-band and L-band, of optical signals propagating through an external optical fiber, comprising: a first amplifying unit configured to be pumped in at least one direction, and amplify the first and second bands of optical signals and output ASE (Amplified Spontaneous Emission); a second amplifying unit configured to be pumped by amplified ASE and configured to secondarily amplify the amplified first band optical signal; and a second-band pumping light source including a third amplifying unit configured to be pumped in at least one direction while being pumped by the ASE, and outputting amplified ASE, wherein the amplified ASE is used to pump the second amplifying fiber.

BRIEF DESCRIPTION OF THE DRAWINGS

The present invention will be more apparent from the following detailed description taken in conjunction with the accompanying drawings, in which.

DETAILED DESCRIPTION OF THE PREFERRED EMBODIMENT

Figure 1:
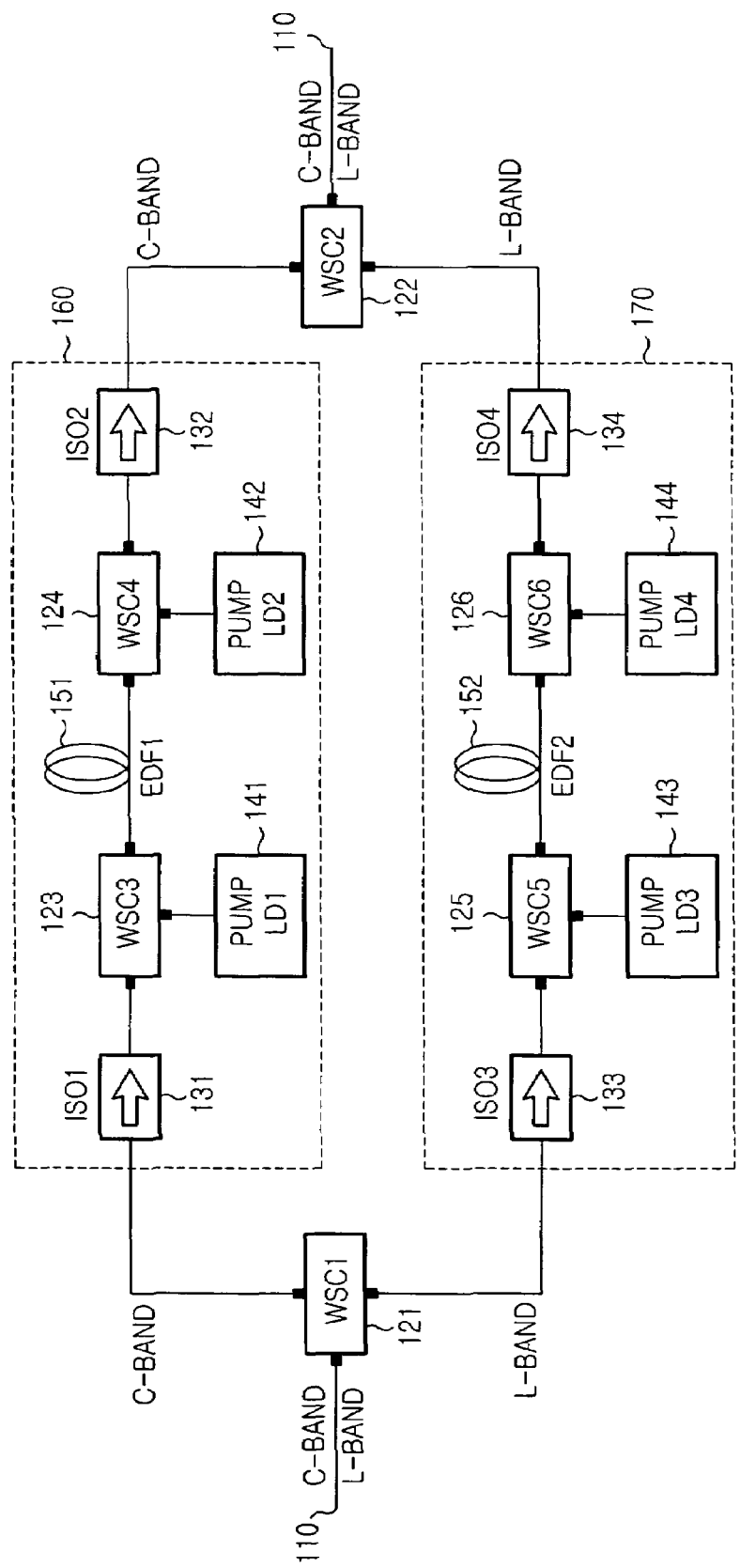
FIG. 1 is a diagram illustrating a conventional wide-band fiber amplifier.

Now, preferred embodiments of the present invention will be described in detail with reference to the annexed drawings. In the following description of the present invention, a detailed description of known functions and configurations incorporated herein will be omitted when it may make the subject matter of the present invention rather unclear.

The present invention provides a wide-band fiber amplifier including circulators and wavelength selective couplers, each of which includes a plurality of ports. Supposing that one circulator or wavelength selective coupler is designated by a particular drawing reference numeral "###", its n-th port will be provided and depicted with drawing reference numeral "###n".

Figure 2:
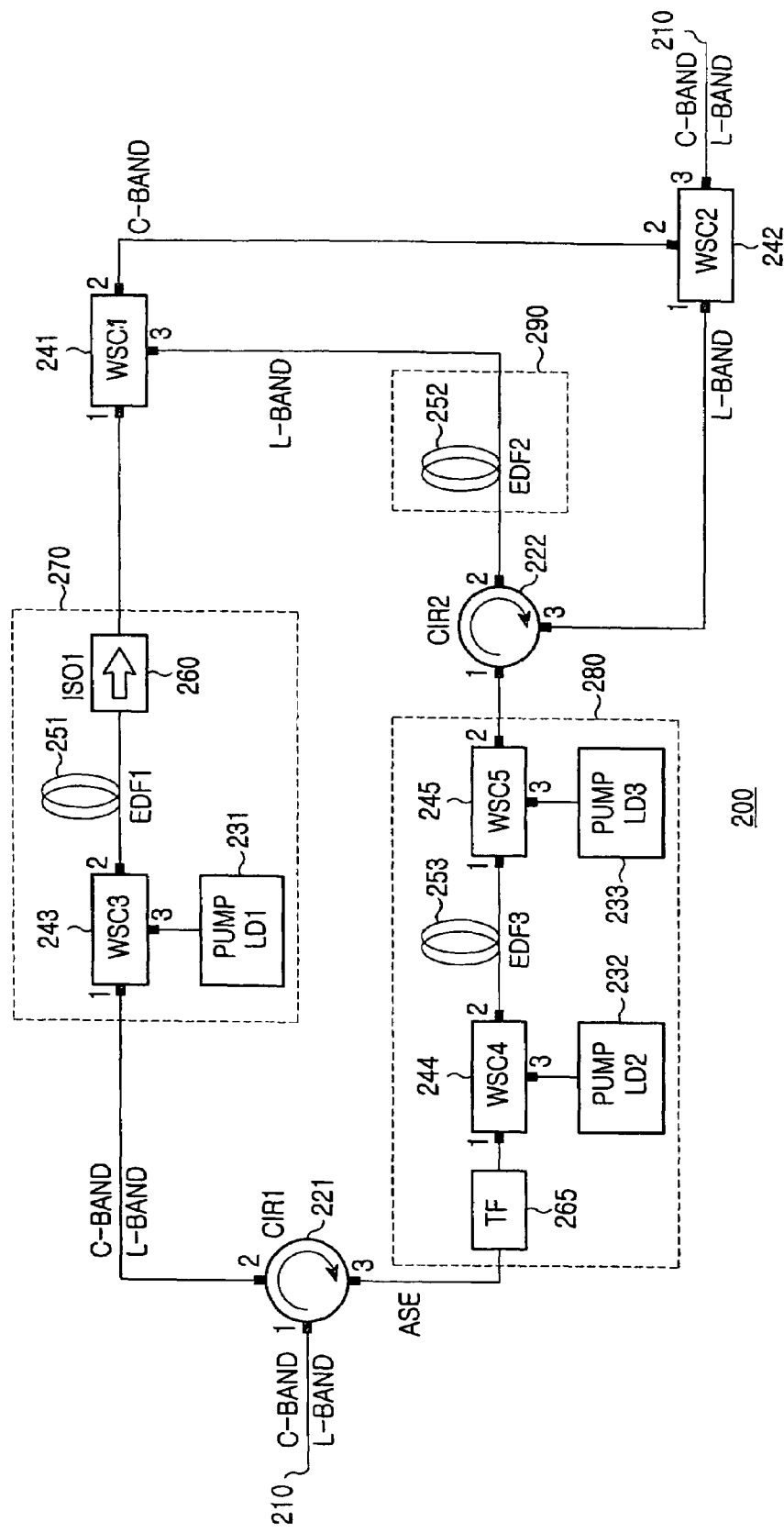
FIG. 2 is a diagram illustrating a wide-band fiber amplifier according to a preferred embodiment of the present invention.

FIG. 2 is a diagram illustrating a wide-band fiber amplifier according to a preferred embodiment of the present invention. As shown in FIG. 2, the wide-band fiber amplifier designated by the reference numeral 200 includes first and second circulators 221 and 222 (CIR1 and CIR2), first and second amplifying units 270 and 290, an L-band pumping source 280, and first and second wavelength selective couplers 241 and 242 (WSC1 and WSC2).

First circulator 221 has first through third ports 2211 to 2213. First circulator 221 is configured to output an optical signal, inputted to a higher-order port, to an adjacent lower-order port. First circulator 221 is connected at its first port 2211 to an external optical fiber 210. Second port 2212 is connected to first amplifying unit 270. Third port 2213 is connected to L-band pumping source 280. First circulator 221 receives, at its first port 2211, a first wavelength band optical signal, for example C-band with a wavelength of 1,550 nm, and a second wavelength band optical signal, for example L-band with a wavelength of 1,590 nm, and outputs the received optical signals to its second port 2212. First circulator 221 also outputs ASE, inputted to its second port 2212, to its third port 2213.

First amplifying unit 270 is connected to second port 2212 of first circulator 221. First amplifying unit 270 includes a first pumping source 231, a third wavelength selective coupler 243 (WSC3), a first amplifying fiber 251, and a first optical isolator 260.

First pumping light source 231 outputs a first pumping light with a wavelength of 980 nm. For first pumping light source 231, a laser diode may be used. (First pumping light source 231 is also designated by "PUMP LD1" in FIG. 2).

Third wavelength selective coupler 243 has first through third ports 2431 to 2433. Third wavelength selective coupler 243 is connected at its first port 2431 to second port 2212 of first circulator 221. Second port 2431 is connected to first amplifying fiber 251. Third port 2433 is connected to first pumping light source 231. Third wavelength selective coupler 243 couples the first pumping light to the C-band and L-band optical signals inputted thereto, and then outputs the resultant optical signals to first amplifying fiber 251.

First amplifying fiber 251 is forward-pumped by the first pumping light, thereby amplifying the C-band and L-band optical signals inputted thereto. First amplifying fiber 251 also outputs ASE advancing in an opposite direction to the optical signals. The ASE from first amplifying fiber 251 is inputted to second port 2212 of first circulator 221. First amplifying fiber 251 outputs the ASE to its third port 2213. For first amplifying optical fiber 251, an erbium-doped fiber may be used. (First amplifying fiber 251 is also designated by "EDF1" in FIG. 2.)

First optical isolator 260 is interposed between first amplifying fiber 251 and first wavelength selective coupler 241. First optical isolator 260 passes inputted C-band and L-band optical signals, while blocking light advancing in an opposite direction.

First wavelength selective coupler 241 has first through third ports 2411 to 2413. First wavelength selective coupler 241 is connected at its first port 2411 to first optical isolator 260. Second port 2412 is connected to second wavelength selective coupler 242. Third port 2413 is connected to second amplifying unit 290. First wavelength selective coupler 241 receives C-band and L-band optical signals at its first port 2411, and outputs the received C-band optical signal and L-band optical signal to its second port 2412 and third port 2413, respectively.

L-band pumping light source 280 is connected to third port 2213 of first circulator 221. L-band pumping light source 280 includes a tunable filter 265 (TF), second and third pumping light source 232 and 233, fourth and fifth wavelength selective couplers 244 and 245 (WSC4 and WSC5), and a third amplifying optical fiber 253. For second and third pumping light sources 232 and 233, laser diodes may be used. (second and third pumping light sources 232 and 233 are also designated by "PUMP LD2" and "PUMP LD3" in FIG. 2, respectively.) For third amplifying optical fiber 253, an erbium-doped fiber may be used. (third amplifying fiber 253 is also designated by "EDF3" in FIG. 2.)

Tunable filter 265 is connected to third port 2213 of first circulator 221. Tunable filter 265 varies in its transmission wavelength range in accordance with current applied thereto, so that it transmits only components, corresponding to a predetermined wavelength range, of ASE inputted thereto. Moreover, the gain of the L-band optical signal can be adjusted using tunable filter 265, by adjusting the wavelength of ASE supplied to the second amplifying unit 290.

Second pumping light source 232 outputs a second pumping light with a wavelength of 980 nm.

Fourth wavelength selective coupler 244 has first through third ports 2441 to 2443. Fourth wavelength selective coupler 244 is connected at its first port 2441 to tunable filter 265. Second port 2442 is connected to third amplifying fiber 253. Third port 2443 is connected to second pumping light source 232. Fourth wavelength selective coupler 244 couples the second pumping light to the inputted ASE, and outputs the resultant light to third amplifying fiber 253.

Third pumping light source 233 outputs a third pumping light with a wavelength of 1,480 nm.

Fifth wavelength selective coupler 245 has first through third ports 2451 to 2453. Fifth wavelength selective coupler 245 is connected at its first port 2451 to third amplifying fiber 253. Second port 2452 is connected to first port 2221 of second circulator 222. Third port 2223 is connected to third pumping light source 233. Fifth wavelength selective coupler 245 outputs the third pumping light to third amplifying fiber 253, and the amplified ASE outputted from the third amplifying fiber 253 to its second port 2452.

Third amplifying fiber 253 is forward-pumped by the second pumping light while being backward-pumped by the third pumping light, thereby amplifying ASE inputted thereto.

Second circulator 222 has first through third ports 2221 to 2223. Second circulator 222 is connected at its first port 2221 to second port 2452 of fifth wavelength selective coupler 245, at its second port 2222 to second amplifying optical fiber 252, and its third port 2223 to first port 2421 of second wavelength selective coupler 242. Second circulator 222 outputs amplified ASE, inputted to its first port 2221, to its second port 2222, while outputting an amplified L-band optical signal, inputted to its second port 2222, to its third port 2223.

Second amplifying unit 290 is interposed between third port 2413 of first wavelength selective coupler 241 and second port 2222 of second circulator 222. Second amplifying unit 290 includes a second amplifying fiber 252. For second amplifying fiber 252, an erbium-doped fiber may be used. (second amplifying fiber 252 is also designated by "EDF2" in FIG. 2.) Second amplifying fiber 252 is backward-pumped by the amplified ASE from second circulator 222, thereby secondarily amplifying the inputted amplified L-band optical signal. Accordingly, the L-band optical signal is amplified twice once by each of first and second amplifying units 270 and 290.

Second wavelength selective coupler 242 has first through third ports 2421 to 2423. Second wavelength selective coupler 242 is connected at its first port 2421 to third port 2223 of second circulator 222. Second port 2422 is connected to second port 2412 of first wavelength selective coupler 241. Third port 2423 is connected to external optical fiber 210. Second wavelength selective coupler 242 couples the amplified L-band optical signal, from its first port 2421, and the secondarily-amplified C-band optical signal, from second port 2422. The resultant optical signal is outputted to its third port 2423.

Figure 3:
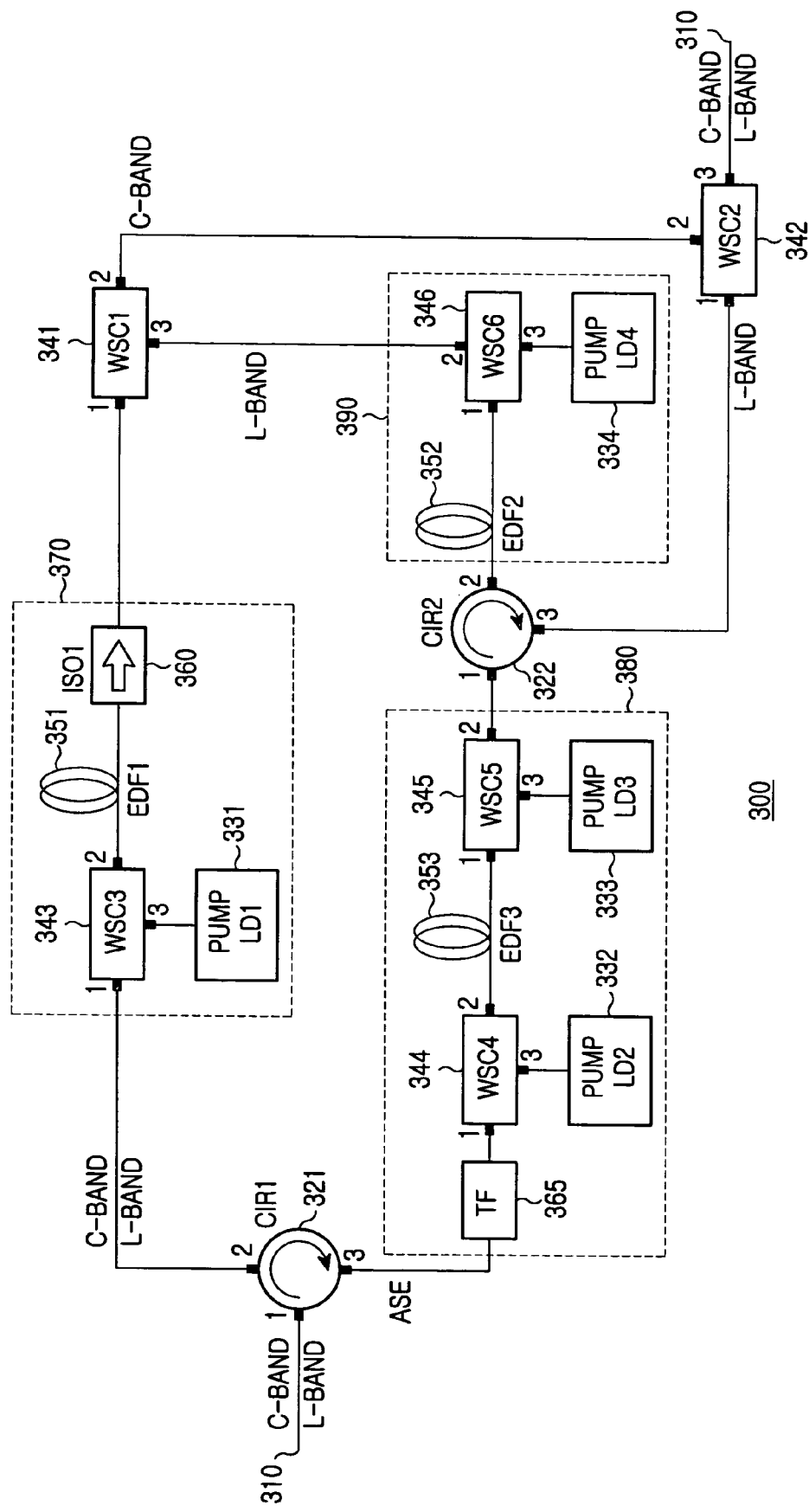
FIG. 3 is a diagram illustrating a wide-band fiber amplifier according to another preferred embodiment of the present invention.

As is apparent from the above description, wide-band fiber amplifier 200 can obtain a high amplification efficiency. This efficiency results in part to the second amplifying fiber 252, which is pumped by ASE of the C-band, being adapted to amplify the L-band optical signal. In wide-band fiber amplifier 200, the wavelength of amplified ASE supplied to second amplifying fiber 252 is also adjusted by tunable filter 265. Accordingly, it is possible to adjust the gain and gain flatness of the L-band optical signal. This is achieved using the gain characteristics of the amplifying fiber varying in accordance with the wavelength of the pumping light (C-band). Wide-band fiber amplifier 200 also exhibits a reduced noise figure in the L-band, as compared to conventional amplifiers, in that both the C-band and L-band optical signals are amplified through first amplifying fiber 251 for front-end amplification. FIG. 3 is a diagram illustrating a wide-band fiber amplifier according to a preferred embodiment of the present invention. As shown in FIG. 3, the wide-band fiber amplifier designated by the reference numeral 300 includes first and second circulators 321 and 322, first and second amplifying units 370 and 390, an L-band pumping source 380, and first and second wavelength selective couplers 341 and 342. The configuration of FIG. 3 is similar to that of FIG. 2, and so, its duplicate description will be omitted, and description will be given only for second amplifying unit 390.

Second amplifying unit 390 is interposed between third port 3413 of first wavelength selective coupler 341 and second port 3222 of second circulator 322. Second amplifying unit 390 includes a second amplifying optical fiber 352, a fourth pumping light source 334, and a sixth wavelength selective coupler 346.

Fourth pumping light source 334 outputs a third pumping light with a wavelength of 980 nm or 1,480 nm. For fourth pumping light source 334, a laser diode may be used.

Sixth wavelength selective coupler 346 has first through third ports 3461 to 3463. Sixth wavelength selective coupler 346 is connected at its first port 3461 to second amplifying fiber 352. Second port 3462 is connected to third port 3413 of first wavelength selective coupler 341. Third port 3463 is connected to fourth pumping light source 334. Sixth wavelength selective coupler 346 couples the fourth pumping light and L-band optical signal inputted thereto, and then outputs the resultant optical signal to second amplifying fiber 352.

Second amplifying fiber 352 is forward-pumped by the fourth pumping light while being backward-pumped by ASE inputted thereto, thereby secondarily amplifying the L-band optical signal inputted thereto.

As is apparent from the above description, the present invention provides a wide-band fiber amplifier in which its amplifying fiber is adapted to only amplify an L-band optical signal that is pumped by ASE of the C-band. Consequently, a high amplification efficiency is obtained. The wide-band fiber amplifier of the present invention also exhibits a reduced noise figure in the L-band, as compared to conventional optical fiber amplifiers, in that both the C-band and L-band optical signals are amplified through an amplifying fiber for front-end amplification.

In the wide-band fiber amplifier of the present invention, the wavelength of amplified ASE to be supplied to the amplifying fiber adapted to only amplify an L-band optical signal is also adjusted by a tunable filter. Accordingly, it is possible to adjust the gain and gain flatness of the L-band optical signal.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A wide-band fiber amplifier for amplifying a first and second wavelength band of optical signals, comprising:
   a first amplifying unit configured to (1) be pumped in at least one direction, (2) amplify the first and second wavelength bands of optical signals and (3) output Amplified Spontaneous Emission (ASE);
   a second amplifying unit configured to be pumped by an amplified ASE and configured to secondarily amplify the amplified second wavelength band optical signal; and
   a second-band pumping light source including a third amplifying unit configured to be pumped in at least one direction, amplify the ASE from the first amplifying unit, and output the amplified ASE to the second amplifying unit.

2. The wide-band fiber amplifier according to claim 1, wherein the amplified first-band optical signal and the secondarily-amplified second-band optical signal are outputted to an external optical fiber.

3. The wide-band fiber amplifier according to claim 2, wherein the first and second band optical signals are C-band and L-band optical signals, respectively, and the second-band pumping light source is an L-band pumping light source.

4. The wide-band fiber amplifier according to claim 3, wherein the first amplifying unit includes a first amplifying fiber adapted to be pumped in at least one direction.

5. The wide-band fiber amplifier according to claim 3, wherein the second amplifying unit includes a second amplifying fiber adapted to be pumped by amplified ASE.

6. The wide-band fiber amplifier according to claim 3, wherein the L-band pumping light source includes a third amplifying fiber adapted to be pumped in at least one direction and amplify the ASE.

7. The wide-band fiber amplifier according to claim 4, wherein the first amplifying unit further comprises:
 a pumping light source to produce a pumping light with a predetermined wavelength; and
 a wavelength selective coupler to output the pumping light to the first amplifying fiber.

8. The wide-band fiber amplifier according to claim 7, wherein the first amplifying unit further comprises an optical isolator to allow the C-band and L-band optical signals from the first amplifying fiber to pass, while blocking light in an opposite direction.

9. The wide-band fiber amplifier according to claim 6, wherein the L-band pumping light source further comprises:
 a first pumping light source to produce a first pumping light with a predetermined wavelength;
 a first wavelength selective coupler to output the first pumping light to the third amplifying fiber;
 a second pumping light source to produce a second pumping light with a predetermined wavelength; and
 a second wavelength selective coupler to output the second pumping light to the third amplifying fiber.

10. The wide-band fiber amplifier according to claim 9, wherein the L-band pumping light source further comprises a tunable filter for transmitting only components, corresponding to a predetermined wavelength range, of the ASE from the first amplifying unit.

11. The wide-band fiber amplifier according to claim 5, wherein the second amplifying unit further comprises:
 a pumping light source to produce a pumping light with a predetermined wavelength; and
 a wavelength selective coupler to output the pump light to the second amplifying optical fiber.

12. The wide-band fiber amplifier according to claim 3, further comprising:
 a first circulator to output (1) received C-band and L-band optical signals to the first amplifying unit, and output received ASE from the first amplifying unit to the L-band pumping light source;
 a first wavelength selective coupler to -split the C-band and L-band optical signals from the first amplifying unit and output the split C-band optical signal and output the split L-band optical signal to the second amplifying unit;
 a second circulator to output received amplified ASE from the L-band pumping light source to the second amplifying unit, -and output received secondarily-amplified L-band optical signal from the second amplifying unit; and
 a second wavelength selective coupler for receiving the split C-band optical signal from the first wavelength selective coupler and the secondarily-amplified L-band optical signal from the second circulator, and outputting the received optical signals.

\* \* \* \* \*